United States Patent
Lee et al.

(10) Patent No.: US 9,298,564 B2
(45) Date of Patent: Mar. 29, 2016

(54) IN PLACE POINT-IN-TIME RECOVERY OF PLUGGABLE DATABASES

(71) Applicant: ORACLE INTERNATIONAL CORPORATION, Redwood Shores, CA (US)

(72) Inventors: J. William Lee, Belmont, CA (US); Vipin Gokhale, San Ramon, CA (US); Muthu Olagappan, Belmont, CA (US); Sanket Hase, Mountain View, CA (US); Vivekanandhan Raja, Foster City, CA (US); Michael John Skarpelos, San Jose, CA (US); Michael Stewart, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 91 days.

(21) Appl. No.: 13/830,349

(22) Filed: Mar. 14, 2013

(65) Prior Publication Data
US 2014/0095452 A1    Apr. 3, 2014

Related U.S. Application Data

(60) Provisional application No. 61/707,726, filed on Sep. 28, 2012.

(51) Int. Cl.
| | |
|---|---|
| *G06F 17/30* | (2006.01) |
| *G06F 11/14* | (2006.01) |
| *G06F 21/62* | (2013.01) |

(52) U.S. Cl.
CPC ...... *G06F 11/1471* (2013.01); *G06F 17/30566* (2013.01); *G06F 21/6218* (2013.01)

(58) Field of Classification Search
CPC .................. G06F 11/1471; G06F 11/1474
USPC ................................... 707/683, 684
See application file for complete search history.

(56) References Cited

U.S. PATENT DOCUMENTS

| | | | |
|---|---|---|---|
| 6,804,671 B1 | 10/2004 | Loaiza et al. | |
| 7,822,717 B2 * | 10/2010 | Kapoor et al. | 707/680 |

(Continued)

OTHER PUBLICATIONS

U.S. Appl. No. 13/631,815, filed Sep. 28, 2012, Office Action, Dec. 23, 2013.

(Continued)

*Primary Examiner* — James Trujillo
*Assistant Examiner* — Giuseppi Giuliani
(74) *Attorney, Agent, or Firm* — Hickman Palermo Becker Bingham LLP

(57) ABSTRACT

In an approach, a database server maintains a container database which comprises: one or more pluggable databases, a root database that stores an undo log for rolling back transactions on the consolidated database, and a redo log for replaying modifications to the container database. The database server restores a particular pluggable with a backup version that corresponds to a first point in time. The database server generates a clone database loaded with a backup version of the root database that corresponds to the first point in time. The database server applies the redo log to recover the particular pluggable database and the clone database to a second point in time that is later than the first point in time. The database server identifies, based on the clone database, one or more active transactions on the particular pluggable database. The database server rolls back the one or more active transactions.

20 Claims, 8 Drawing Sheets

(56) References Cited

U.S. PATENT DOCUMENTS

| | | | |
|---|---|---|---|
| 8,364,648 B1* | 1/2013 | Sim-Tang | 707/674 |
| 2002/0112022 A1* | 8/2002 | Kazar et al. | 709/217 |
| 2003/0061537 A1* | 3/2003 | Cha et al. | 714/16 |
| 2004/0267809 A1* | 12/2004 | East et al. | 707/104.1 |
| 2005/0038831 A1 | 2/2005 | Souder et al. | |
| 2007/0100912 A1* | 5/2007 | Pareek et al. | 707/204 |
| 2007/0244918 A1* | 10/2007 | Lee et al. | 707/102 |
| 2010/0318570 A1 | 12/2010 | Narasinghanallur et al. | |
| 2011/0004586 A1* | 1/2011 | Cherryholmes et al. | 707/682 |
| 2011/0060724 A1* | 3/2011 | Chan | 707/683 |
| 2011/0087633 A1* | 4/2011 | Kreuder et al. | 707/610 |
| 2011/0307450 A1* | 12/2011 | Hahn et al. | 707/649 |
| 2012/0109926 A1 | 5/2012 | Novik et al. | |
| 2013/0085742 A1 | 4/2013 | Barker et al. | |
| 2013/0117237 A1* | 5/2013 | Thomsen et al. | 707/683 |
| 2013/0212068 A1* | 8/2013 | Talius et al. | 707/639 |
| 2014/0095530 A1 | 4/2014 | Lee et al. | |
| 2014/0095546 A1 | 4/2014 | Kruglikov et al. | |
| 2014/0164331 A1 | 6/2014 | Li et al. | |
| 2015/0254240 A1 | 9/2015 | Li et al. | |

OTHER PUBLICATIONS

Dominic Betts et al., "Developing Multi-Tenant Applications for the Cloud," 3rd Edition, Microsoft, 2012, 246 pages.

Rajeev Kumar et al., Oracle DBA, A Helping Hand, Container Database and Pluggable Database (CDB & PDB), retrieved from the internet on Dec. 4, 2013, 2 pages.

Preimesberger, Chris, "Oracle Profits Up, but Revenues Slip" Oracle, dated Sep. 20, 2012, 2 pages.

U.S. Appl. No. 13/841,272, filed Mar. 15, 2013, Restriction Requirement, Jan. 8, 2015.

U.S. Appl. No. 13/631,815, filed Sep. 28, 2012, Office Action, Nov. 6, 2014.

Muhammad Anwar, "How to Install Oracle 12c Multitenant Pluggable Database", Dated Feb. 24, 2012, 27 pages.

Oracle Base, Multitenant: Create and Configure a Pluggable Database (PDB) in Oracle Database 12c Release 1 (12.1), dated Jan. 8, 2014, 16 pages.

Garcia-Molina et al., "Database System Implementation", dated Jan. 1, 2000, 84 pages.

Francisco Munoz et al., "Oracle Database 12c Backup and Recovery Survival Guide", dated Sep. 24, 2013, 8 pages.

Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.

Anonymous: "Oracle-Base—Multitenant: Overview of Container Databases (CDB) and Pluggable Databases (PDB)", dated Mar. 3, 2014, 4 pages.

Anonymous, :An Oracle White Paper Oracle Database Appliance: Migration Strategies, dated Jun. 2012, 14 pages.

U.S. Appl. No. 13/631,815, filed Sep. 28, 2012, Notice of Allowance, Aug. 20, 2015.

\* cited by examiner

IN PLACE POINT-IN-TIME RECOVERY OF PLUGGABLE DATABASES

CROSS-REFERENCE TO RELATED APPLICATIONS; BENEFIT CLAIM

This application claims priority to U.S. Provisional Application No. 61/707,726, entitled CONTAINER DATABASE, filed Sep. 28, 2012 by J. William Lee, et. al., the contents of which are incorporated herein by reference. The application is related to U.S. Non-provisional application Ser. No. 13/631,815, entitled CONTAINER DATABASE, filed on Sep. 28, 2012 by J. William Lee, et. Al, the contents of which are hereby incorporated herein by reference.

FIELD OF THE INVENTION

The present invention relates to in-place point-in-time recovery of pluggable databases.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database Consolidation

Database consolidation involves distributing and sharing computer resources of a hardware platform among multiple databases. Important objectives of database consolidation include isolation, transportability, and fast provisioning. Isolation is the ability to limit an application's access to the appropriate database; an application is permitted access to a database while other applications are prevented access.

Transportability is another important objective. Transportability is the ability to efficiently move databases between hosts. Transportability facilities distribution of computer resources between databases being consolidated.

Fast provisioning is the ability to quickly deploy a database on a host. Fast provisioning facilitates transportability by enabling existing databases to be moved and/or copied to another host quickly. Fast provisioning also facilitates rapid deployment of new database to a host.

Database Recovery

A major responsibility of a database management system (DBMS) is to prepare for the possibility of a system failure. If such a failure affects the operation of a database, the DBMS must recover the database and return to normal operation as quickly as possible to minimize the effect of the failure on the database's users.

To expedite recovery, DBMSs may attempt to perform a partial database recovery focused on the portion of the database which encountered the failure. For example, a database may store data across a multitude of media devices. If one of the media devices encounters a failure, a recovery targeting the data stored on the failed media device may be quicker than recovering the entire database to a point in time prior to the failure.

However, a partial database point-in-time recovery is in general a difficult problem. For a database to be operational, multiple data areas need to be consistent with one another, such as user data areas, database dictionaries, rollback (undo) segments, etc. As a result, recovering part of the database to a prior point in time while maintaining database consistency can be extremely tricky.

In one approach, known as tablespace point-in-time recovery, the database comprises one or more separate tablespaces which store the database's data. To perform recovery, the DBMS recovers the entire database in a separate staging area. For example, recovering the database may include loading a backup of the database into the separate staging area, applying redo logs to bring the backup forward to the desired point in time, and rolling back any active transactions on the backup that have not yet committed. The DBMS then substitutes the tablespace to be recovered in the original database for the corresponding tablespace of the backup, along with importing the database dictionary and associated metadata.

DETAILED DESCRIPTION

Figure 1:
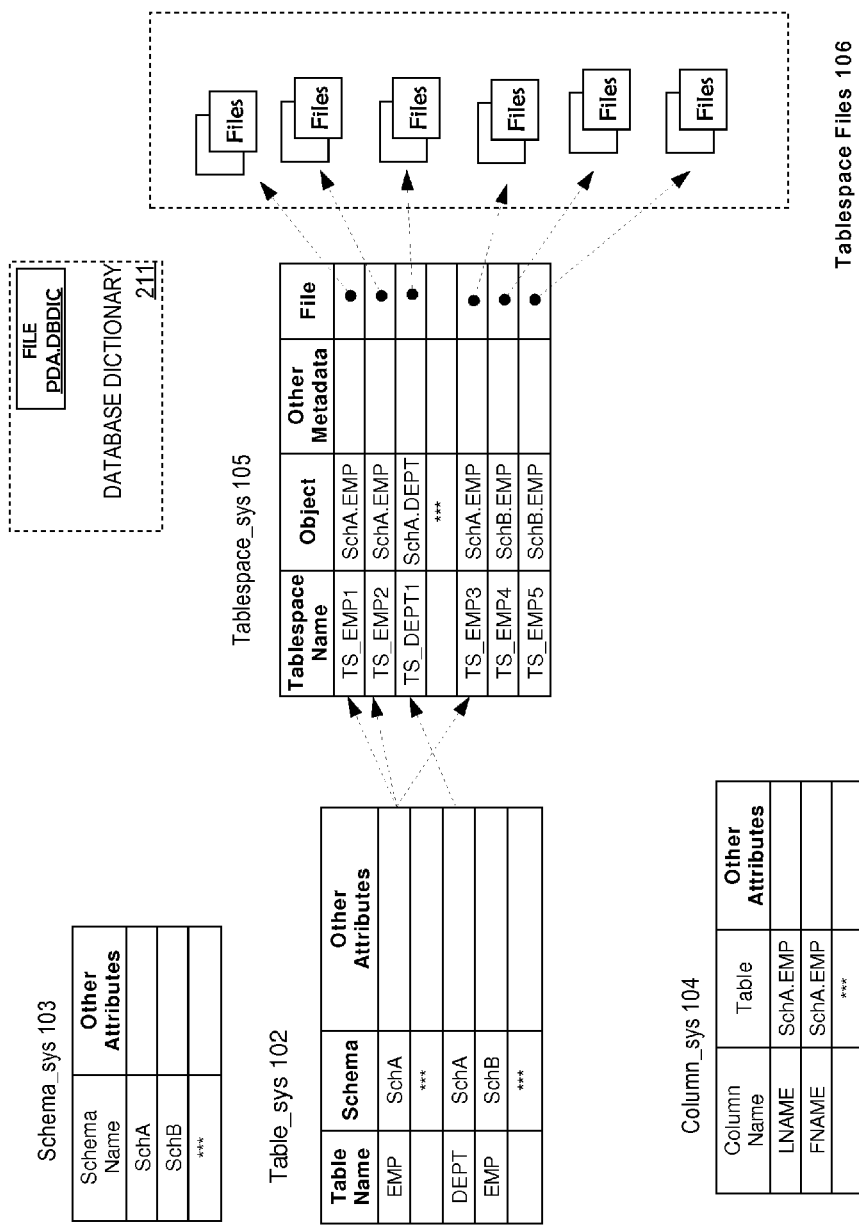
FIG. 1 depicts a database dictionary according to an embodiment.

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A container database may contain multiple separate databases, which are referred to herein as pluggable databases. Each pluggable database is defined by its own separate database dictionary. A database dictionary comprises metadata that defines database objects contained in a database. In effect, a database dictionary defines the totality of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

The point-in-time recovery approach described above in the Background, while suitable for a singular (non-container) database, causes a host of problems when applied to a container database.

As one issue, the tablespace point-in-time recovery is performed in a separate staging area. Thus, the modifications performed to the backup as a result of rolling back the active transactions are never recorded in the redo log of the original database. As a result, the redo log of the original database becomes non-contiguous, rendering any previously stored backups invalid. To counteract this issue, tablespace point-in-time recovery requires a new backup to be taken before the database can be reopened to the users, which may cause significant delay. In addition, the non-contiguity of the redo log also plays havoc with standby databases, which must import the recovered tablespace from the primary site following a point-in-time recovery. For large databases, the import may take weeks to complete and have a detrimental impact on the users. This may prevent the standby database from proceeding for weeks, leaving the primary database unprotected in the meantime.

As another issue, the recovery of one pluggable database should be isolated from the others. Thus, while one pluggable database is being recovered, the other pluggable databases should still be available to the users.

Described herein are approaches to performing in-place point-in-time recovery of pluggable databases.

In an embodiment, a database server maintains a container database that comprises one or more pluggable databases, a root database, and a redo log where the database server records modifications to the container database. The root database stores data that is shared across the one or more pluggable databases, including a shared undo log where the database server records changes performed by transactions on one or more pluggable databases and the root database.

In an embodiment, to resolve the first issue, pluggable databases are recovered "in place". The term "in place" refers to the database server recovering the pluggable databases on the container database, as opposed to performing the recovery in a separate staging area. For example, loading the pluggable database with a backup version, applying redo logs to bring the pluggable database to a desired point in time, and rollback of the active transactions can be performed while the pluggable database resides on the container database.

Thus, any modifications performed to the pluggable database, for instance as a result of rolling back the active transactions, are recorded in the container database's redo log. Since the redo log remains contiguous, the backups remain valid for future recoveries. However, due to the container database's undo log being shared between all the pluggable databases, the undo log cannot be recovered in place without rendering the other pluggable databases unavailable. Without recovering the undo log to the same point in time as the pluggable database, the database server cannot identify the active transactions on the pluggable database and perform rollback.

To resolve the isolation issue, the database server generates a clone database in a separate staging area and loads the clone database with the backup version of the root database, which includes the undo log. The database server then applies records from the redo log to bring the clone database up to the same point in time as the pluggable database. As a result, the undo log of the clone database contains records pertaining to the active transactions on the pluggable database. The database server, based on the undo log of the clone database, identifies and rolls back the active transactions on the pluggable database. Once the roll backs have completed, the database server may then make the pluggable database available to the users. Therefore, since the shared areas of the container database are recovered out of place, the other pluggable databases are able to remain online and active during recovery.

Database Systems

Embodiments of the present invention are used in the context of DBMSs. Therefore, a description of a DBMS is useful.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Database Dictionary and Database Data Storage

As indicated earlier, the database dictionary is central to a DBMS's management of a database. The database dictionary contains metadata that defines database objects physically or logically contained in the database. Database objects include tables, columns, data types, users, user privileges, and storage structures used for storing database object data. The database dictionary is modified according to DDL commands issued to add, modify, or delete database objects.

FIG. 1 depicts a Database Dictionary 101. For purposes of exposition, only some aspects of Database Dictionary 101 and data structures contained therein are depicted in FIG. 1. Database dictionary 101 includes Table_sys 102, Schema_sys 103, Column_sys 104, and Tablespace_sys 105.

Table_sys 102 is a table that contains metadata that defines, at least in part, tables within a database. Table_sys 102 comprises (1) records that each define a table, and (2) attributes, each of which describe an aspect or property of a table. Among such attributes are Table Name and Schema. Table_sys 102 contains other attributes not specifically depicted in FIG. 1. Table Name is a name or label for a table, and Schema is the schema to which the table belongs. A schema is a defined and/or labeled set of database objects. One record in Table_sys 102 defines a table as having the name EMP and belonging to schema SchA. Another record defines a table as having the name DEPT and belonging to schema SchA. A third record in Table_sys 102 defines another table also as having the name EMP, but belonging to schema SchB.

Schema_sys 103 defines schemas. Schema_sys 103 has attribute Schema Name as well as other attributes. One record in Schema_sys 103 defines a schema having the name SchA; another record defines a schema having the name SchA.

Column_sys 104 is a table containing metadata defining column database objects. Column_sys 104 has attributes Column Name and Table, among other attributes. Column Name is a name or label for a column, and Table identifies a table to which a column belongs.

Tablespace_sys 105 is a table defining tablespaces. A tablespace is set of one or more files, or one or more portions of a file, or combination thereof, that is used to store data for database objects, such as data for a table or index. Each record in Tablespace_sys 105 defines a tablespace. Attributes of Tablespace_sys 105 each describes an aspect or property of a tablespace. The attribute Tablespace Name is a name or label for a tablespace. Attribute Object identifies a database object for which a tablespace stores data. Attribute File specifies one or more files that are in a tablespace. One record in Tablespace_sys 105 defines a tablespace as having the name TS_EMP1 and being used to store table EMP in schema SchA, as specified by the Object attribute value of SchA.EMP. Another record in Tablespace_sys 105 defines a tablespace as having the name TS_DEPT1 and being used to store data for table DEPT in schema SchA, as specified by the Object attribute value of SchA.EMP. Yet another record in Tablespace_sys 105 defines a tablespace as having the name TS_EMP4 and being used to store table EMP in schema SchB, as specified by the Object attribute value of SchB.EMP.

Database Dictionary 101 is expositive and illustrative of a database dictionary but not limiting. For example, a database dictionary may have more tables and attributes than those depicted for Database Dictionary 101. Other tables may define users, user privileges, and which user privileges are granted to which user. Furthermore, data structures of a database dictionary are not limited to tables, such as the tables depicted in FIG. 1

Blocks, Extents, and Segments

Figure 2:
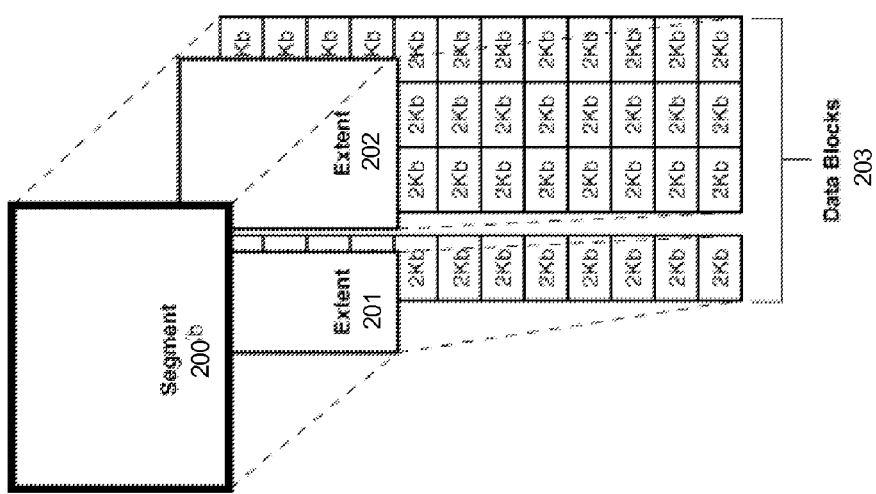
FIG. 2 illustrates a structure in which a DBMS stores data according to an embodiment.

In some embodiments, the DBMS stores data, such as tablespace files, in one or more structures, such as blocks, extents, and segments. FIG. 2 illustrates an example structure in which a DBMS stores data according to an embodiment.

In FIG. 2, Data Blocks 203 represent the finest level of granularity at which the DBMS stores data. Each of the Data Blocks 203 corresponds to a specific amount of physical space on disk. As an illustrative example, Data Blocks 203 are depicted in FIG. 2 as each representing 2Kb worth of storage. However, other embodiments may use data blocks that are smaller or larger than 2Kb.

The next level of logical database storage is extents, illustrated by Extent 201 and Extent 202, which each represent a specific number of contiguous Data Blocks 203 allocated for storing a specific type of information. For convenience, only two extents have been depicted in FIG. 2, but other embodiments may organize the Data Blocks 203 into more or less than two extents depending on the quantity and type of information that needs to be stored.

The level of logical database storage greater than an extent is called a segment, illustrated by Segment 200. The Segment 200 represents a set of extents, such as Extent 201 and Extent 202, each of which has been allocated for a specific data structure and all of which are stored in the same tablespace. For example, each table's data may be stored in its own data segment, while each index's data is stored in its own index segment.

Container Database Management System

Figure 3A:
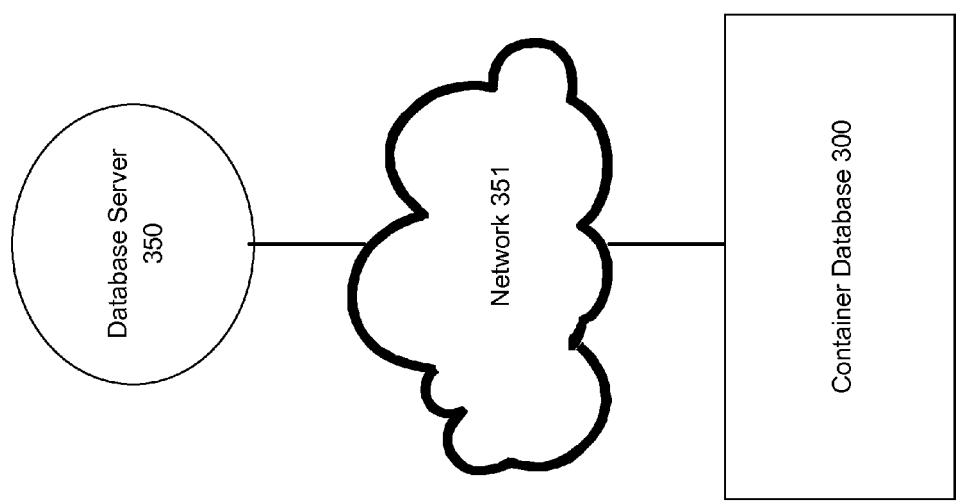
FIG. 3A illustrates a DBMS according to an embodiment.

FIG. 3A depicts an example DBMS upon which an embodiment may be implemented. Although FIG. 3A only depicts a particular number of each element, a practical environment may have many more, perhaps hundreds or thousands, of each of the elements illustrated in FIG. 3A.

In FIG. 3A, Database Server 350 represents a combination of software and resources on one or more computing devices that are communicatively coupled to Container Database 300 via Network 351. An example of a computing device upon which the Database Server 350 may be implemented is described below in the "Hardware Overview". In some embodiments, Database Server 350 is configured to accept user commands, such as such as Data Definition Language (DDL) and Data Manipulation Language (DML) instructions, and carry out those commands on Container Database 300.

Network 351 represents one or more local networks, wide area networks, internetworks, or service provider networks. In some embodiments, Network 351 represents the Internet.

Figure 3B:
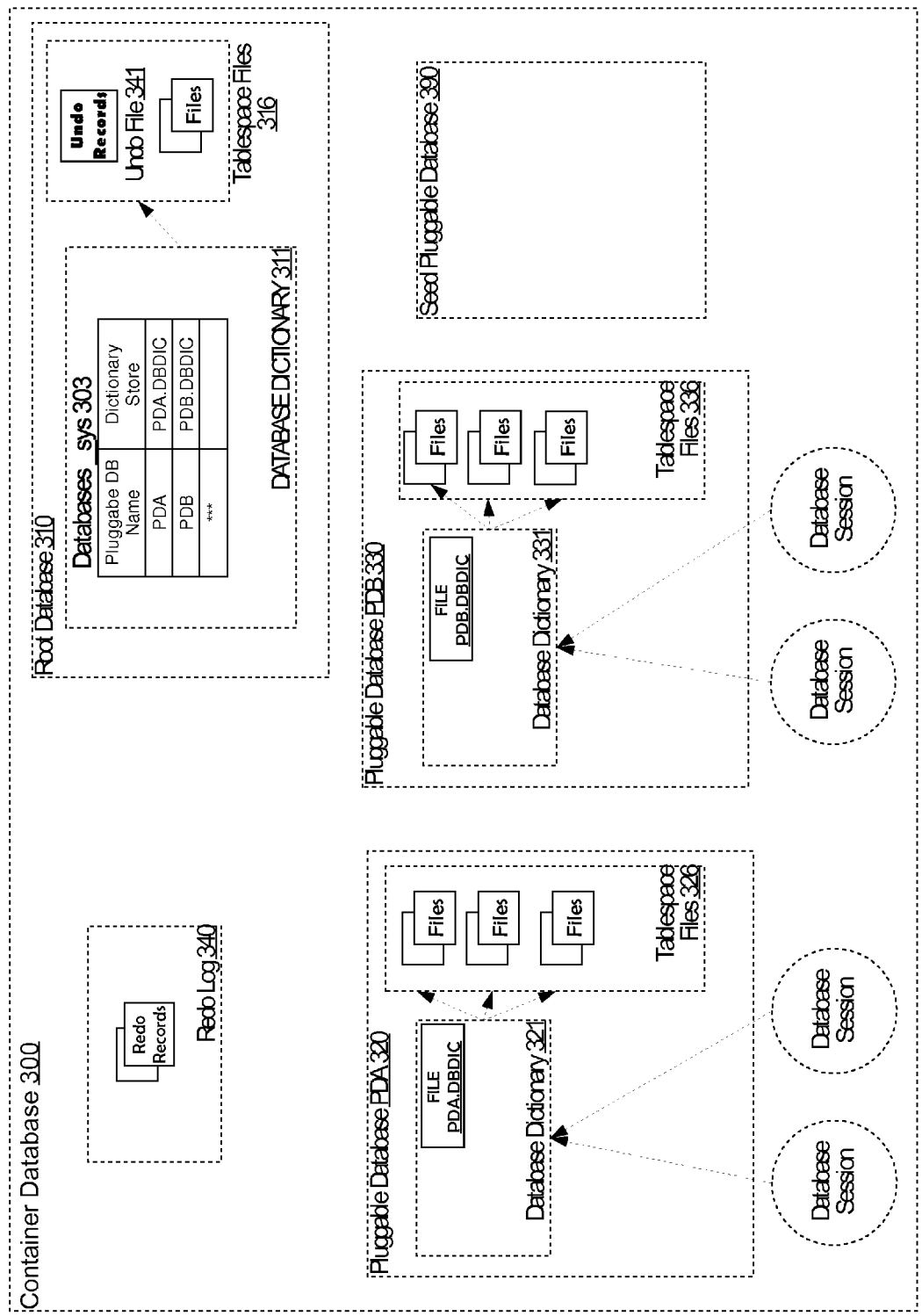
FIG. 3B illustrates a detailed view of a container database according to an embodiment.

FIG. 3B depicts a detailed view of Container Database 300 according to an embodiment of the present invention. Container Database 300 contains multiple databases that are hosted and managed by Database Server 350. The databases include Pluggable Database PDA 320 and Pluggable Database PDB 330, and Root Database 310, which is associated with Pluggable Database PDA 320 and Pluggable Database PDB 330, as shall be explained in greater detail. In other embodiments, the Container Database 300 may contain more pluggable databases than the number of pluggable databases that are depicted in FIG. 3B. Root Database 310 is a database that is used by the Database Server 350 to globally manage Container Database 300, and to store metadata and/or data for "common database objects" that are accessible to users of multiple pluggable databases.

Referring to FIG. 3B, Pluggable Database PDA 320 includes Database Dictionary 321. Data for database objects of Pluggable Database PDA 320 is stored in Tablespace Files 326. Similar to user data, metadata for a database dictionary is stored persistently in a dictionary store. Metadata contained in Database Dictionary 321 is stored in file PDA.DBDIC.

Pluggable Database PDB 330 includes Database Dictionary 231. Tablespace Files 336 store data for database objects of Pluggable Database PDB 330. Metadata for a Database Dictionary 331 is stored persistently in file PDB.DBDIC.

A database dictionary of the pluggable database may be referred to herein as a pluggable database dictionary. A database object defined by a pluggable database dictionary that is not a common database object is referred to herein as a pluggable database object.

Root Database

Root Database 310 is a database used by the Database Server 350 to globally manage the Container Database 300. An important function facilitated by Root Database 310 is to define pluggable databases within Container Database 300. Similar to pluggable databases, Root Database 310 includes Database Dictionary 311. The database dictionary of a root database may be referred to herein as a root database dictionary. Database Dictionary 311 contains metadata that defines various aspects of Container Database 300 needed to administer Container Database 300 and the pluggable databases contained therein. Data for database objects defined by Database Dictionary 311 is stored in Tablespace Files 316.

Database Dictionary 311 includes Database_sys 303. Database_sys 303 defines pluggable databases within Container Database 300. Attributes of Database_sys 303 each describes an aspect or property of a pluggable database. The attribute Pluggable DB is a name or label for a pluggable database. The attribute Dictionary Store identifies a dictionary store that holds metadata in a database dictionary. One record in Database Dictionary 311 defines Pluggable Database PDA 320 and its dictionary store file PDA.DBIDC. Another record in Database Dictionary 311 defines Pluggable Database PDB 330 and its dictionary store PDB.DBIDC.

In an embodiment, the Database Dictionary 311 defines common database objects that are in effect shared by pluggable databases in Container Database 300. A common database object is defined in a pluggable database dictionary, which includes a reference to the common database object in the respective root database dictionary. Examples of common database objects include vendor supplied functions, utilities, tables, and views.

According to an embodiment, there are two types of common database objects: a metadata-linked object and an object-linked object. For both, metadata for the common database object is stored in the Root Database 310. However, for a metadata-linked object, data for the common database object, if any, is stored in a pluggable database. Thus, for a metadata-linked object, different pluggable databases may store different data for the same common database object. For an object-linked object, both the metadata and data for the database object, if any, are stored in the Root Database 310. Data for this type of common database object is the same for pluggable databases in the Container Database 300.

Seed Pluggable Database 290 contains database objects and a database dictionary. Seed Pluggable Database 290 is cloned to rapidly create a nascent pluggable database, and facilitates fast provisioning of such pluggable databases. Seed Pluggable Database 290 contains a basic set of database objects that are commonly needed and/or used. For example, Seed Pluggable Database 290 may contain database object links to common database objects and views for accessing the pluggable database dictionary and other system information.

Database Dictionaries 311, 321, and 331 are expositive and illustrative of database dictionaries in a container DBMS but are not limiting.

Undo and Redo Records

Referring to FIG. 3B, Tablespace Files 316 of the Root Database 310 include an Undo File 341, which the Database Server 350 uses to store data and/or metadata ("undo records") related to transactions on the databases contained within Container Database 300. In some embodiments, the undo records store a before and after image of the data being modified during the transactions. For example, if during a transaction the Database Server 350 modifies a "STATE" column of a particular row to change the value from "OHIO" to "CALIFORNIA", the Database Server 350 also stores an undo record in the Undo File 341 specifying the before value "OHIO", the after value "CALIFORNIA", and the location of the modification (e.g. the data block or blocks being modified). If a transaction needs to be rolled back, the Database Server 350 backtracks through the undo records to reverse any modifications the transaction had performed. The undo records may store metadata related to the state of the corresponding transactions, such as metadata indicating whether a transaction is active, has already committed, or is in the process of being rolled back.

Undo records can be used for a variety of purposes, such as rolling back transactions, recovering the database, providing read consistency, etc. In some embodiments, the Undo File 341 is a finite size and thus the Database Server 350 may overwrite the undo records to save space as the transactions occur. For example, the segments storing the undo records may be reused after the corresponding transaction ends (e.g. by committing or being rolled back). However, in other embodiments, the Database Server 350 may retain the undo records for a period of time after the corresponding transactions have ended. For example, the undo records may be retained to provide read consistency for long running queries.

Container Database 300 includes Redo Log 340, which the Database Server 350 uses to store data and/or metadata ("redo records") related to modifications performed on the Container Database 300. For example, each time the Database Server 350 changes a data block of the Container Database 300, the Database Server 350 also stores a redo record in the Redo Log 240 that identifies the block(s) being modified and specifies the before/after values.

In some embodiments, the Database Server 350 identifies redo records based on the state of the database being modified. For example, the Database Server 350 may maintain a "system change number" (SCN) for the Container Database 300. The Database Server 350 increments the SCN each time a transaction commits on one of the underlying databases. The SCN is shared among the Root Database 310 and the pluggable databases. When the Database Server 350 generates a redo record, the redo record is tagged or otherwise associated with information identifying the database being modified and the corresponding SCN. Thus, the SCN serves to identify the state of the corresponding database at the time the redo record was created. In other embodiments, a timestamp may be used to the same effect.

The Redo Log 340, as a result, stores a stream of redo records that can be used by the Database Server 350 to replay modifications to the Container Database 300 when a recovery is required, as will be discussed in more detail below. For convenience, the state of a database will be referred to as existing at a point in time, regardless of the mechanism (timestamp, SCN, etc.) used to identify the state of the database.

Pluggable Database In-Place Point In Time Recovery

Figure 4:
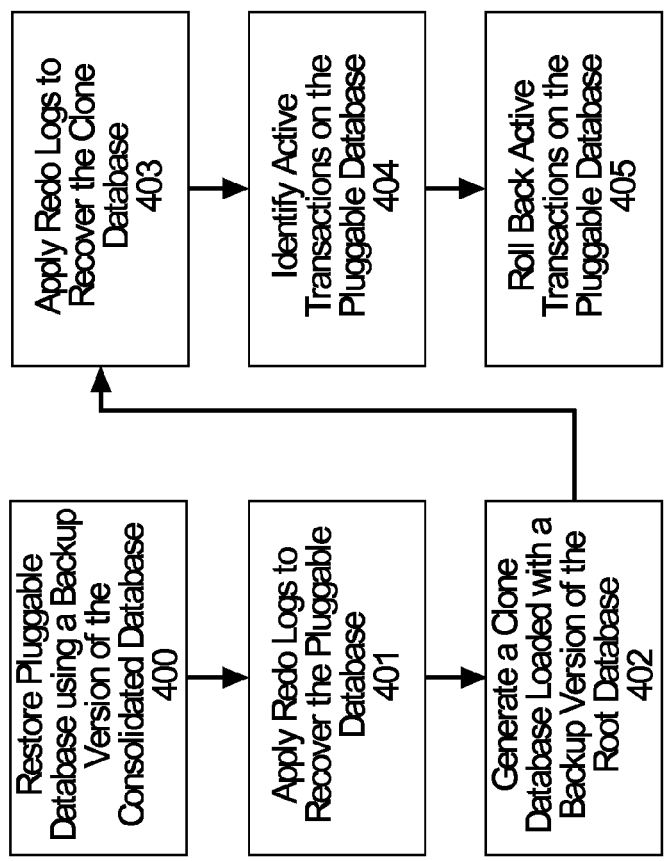
FIG. 4 illustrates, in block diagram form, a database server performing in-place point-in-time recovery for a pluggable database according to an embodiment.

FIG. 4 illustrates, in block diagram form, a database server performing in-place point-in-time recovery for a pluggable database, according to an embodiment. For the following examples, it will be assumed that Database Server 350 performs in-place point-in-time recovery on Pluggable Database PDA 320. Although the blocks of FIG. 4 depict a particular order for the Database Server 350 to follow, other embodiments may perform the blocks of FIG. 4 in a different order.

At block 400, the Database Server 350 restores the Pluggable Database PDA 320 using a backup version of the Container Database 300 that corresponds to a previous point in time.

In an embodiment, the Database Server 350 periodically stores a backup of the Container Database 300 ("backup container database"). For example, the Database Server 350 may be configured to take a backup of the Container Database 300 every set period of time, set number of SCNs, or in response to a user command specifying to take a backup. The Database Server 350 may overwrite the previous backup container database each time a new backup container database is recorded, or alternatively may maintain a library of backup container databases. To recover the Pluggable Database PDA 320, the Database Server 350 substitutes the files (including the Database Dictionary 321 and the Tablespace Files 326) of the Pluggable Database PDA 320 with the corresponding files on the backup container database. The backup container database may be associated with metadata, such as one or more SCNs, indicating when the backup was taken.

In an alternative embodiment, the backup container database may comprise only particular files of the Container Database 300, rather than the entire Container Database 300. For example, the backup may include the files for the Root Database 510 and only one of the pluggable databases, essentially serving as a backup for only a particular pluggable database.

In some embodiments, the Database Server 350 performs block 400 in response to a restoration event. For example, the Database Server 350 may receive a user command specifying to restore the Pluggable Database PDA 320. As another example, the Database Server 350 may detect that the Pluggable Database PDA 320 has become corrupted or that a media device has failed and in response restore the Pluggable Database PDA 320 using an available backup container database.

In an embodiment, the Database Server 350, prior to restoring Pluggable Database PDA 320, brings the Pluggable Database PDA 320 offline or otherwise prevents users from performing actions on the Pluggable Database PDA 320.

At block 401, the Database Server 350 applies redo records from Redo Log 340 to recover the Pluggable Database PDA 320 to a later point in time.

In some embodiments, Database Server 350 performs block 401 in response to a recovery event. For example, the Database Server 350 may receive a user command specifying to recover the Pluggable Database PDA 320 to a specific SCN. As another example, in cases where block 400 was performed in response to a detected error, the Database Server 350 may apply redo records to bring the Pluggable Database PDA 320 to a point in time just before the error occurred.

In an embodiment, the Database Server 350 scans the stream of redo records in the Redo Log 340 and applies the modifications specified by records applicable to the Pluggable Database PDA 320, starting from the point in time of the backup to the later point in time. For example, if the backup started at SCN 200 and the Pluggable Database PDA 320 needs to be recovered to SCN 500, the Database Server 350 applies the redo records tagged with the intervening SCNs (201-500) that are applicable to Pluggable Database PDA 320.

At block 402, the Database Server 350 generates a clone database loaded with a backup version of the Root Database 310 from the backup container database. In an embodiment, the Database Server 350 creates a new container database and copies over the files corresponding to the Root Database 310 (Database Dictionary 311 and Tablespace Files 316) from the backup container database.

Figure 5:
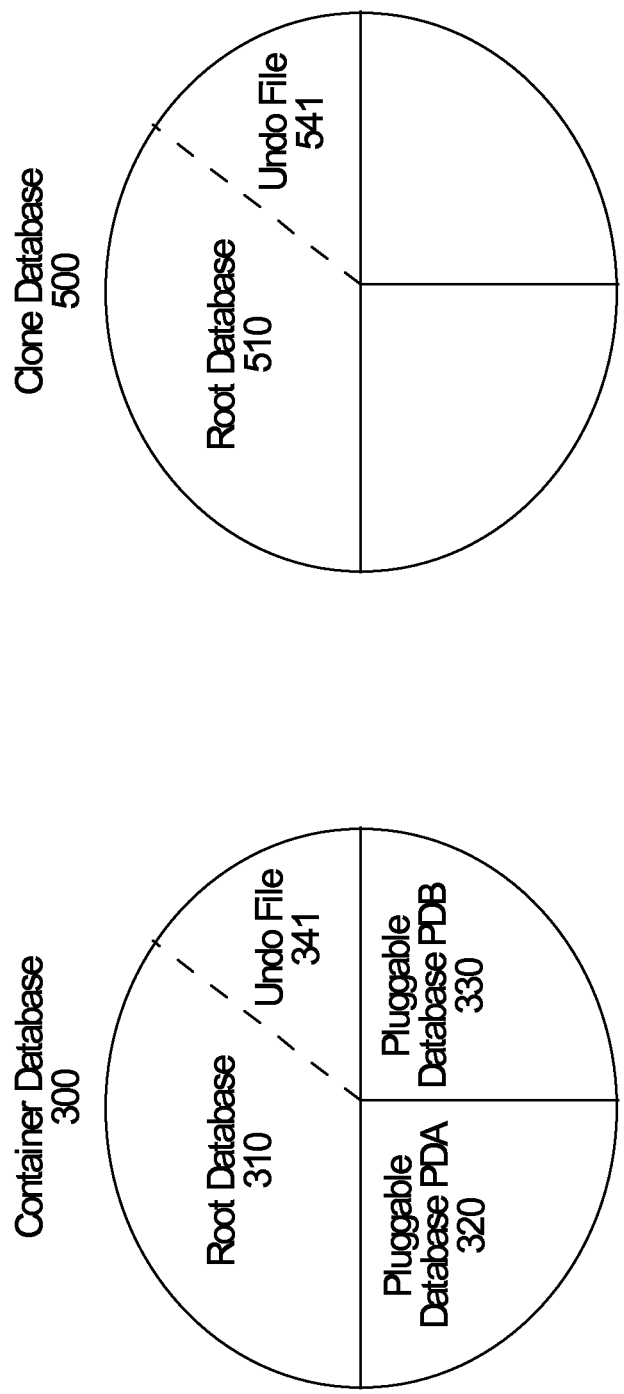
FIG. 5 is an illustration of a clone database according to an embodiment.

FIG. 5 is an illustration of a clone database according to an embodiment. In FIG. 5, Clone Database 500 represents a temporary database created by the Database Server 350 and loaded with Root Database 510 (including Undo File 541), a backup version of the Root Database 310 from the backup container database. To illustrate clear examples, it will be assumed that Clone Database 500 is the clone database generated by the Database Server 350 at block 402.

In some embodiments, Database Server 350 performs blocks 402, 403, and 404 in response to a log recovery event. For example, the Database Server 350 may perform blocks 402, 403, and 404 in response to receiving a user command specifying to make the Pluggable Database PDA 320 ready for access by users of the Database Server 350.

At block 403, the Database Server 350 applies redo records from the Redo Log 340 to recover the Clone Database 500 to the later point in time.

In an embodiment, the Database Server 350 scans the stream of redo records in the Redo Log 340 and applies records tagged for Root Database 310 of the Container Database 300 to Root Database 510 of the Clone Database 500, starting from the point in time of the backup to the later point in time. As a result, the Clone Database 500 is brought up to the same point in time as the Pluggable Database PDA 320.

At block 404, the Database Server 350 identifies transactions on the Pluggable Database PDA 320 that are still active (have not committed). In an embodiment, the Database Server 350 identifies active transactions on the Pluggable Database PDA 320 based on the Undo File 541 of the Clone Database 500. Since the Clone Database 500 and the Pluggable Database PDA 320 have both been brought up to a consistent point in time, the Undo File 541 contains records pertaining to the current transactions on the Pluggable Database PDA 320. As a result, the Database Server 350 discerns, from the undo records of the Undo File 541, transactions on the Pluggable Database PDA 320 that have yet to commit by the later point in time.

At block 405, the Database Server 350 rolls back the active transactions on the Pluggable Database PDA 320. In an embodiment, the Database Server 350 scans backwards through the undo records of the Undo File 541 and reverses any modifications performed by the active transactions. However, since rolling back the transactions causes compensating changes to the data blocks of the Pluggable Database PDA 320, the Database Server 350 also generates redo records in the Redo Log 340 of the Container Database 300 documenting the changes caused by the rollback. The aforementioned redo records ensure that the Redo Log 340 remains contiguous and that the backup container database (and other earlier backups) will remain valid for future point-in-time recoveries.

In some cases, the Redo Log 340 may have redo records which are no longer applicable to the current state of the Pluggable Database PDA 320. For convenience, the aforementioned redo logs will be referred to as "orphaned redo logs". The orphaned redo logs describe modifications to the Pluggable Database PDA 320 that are no longer valid due to following a state of the Pluggable Database PDA 320 that no longer exists. In one embodiment, the Database Server 350 may drop the orphaned redo records from the Redo Log 340. However, in other embodiments, the Database Server 350 may keep the orphaned redo logs around as pertaining to different versions or "incarnations" of the Pluggable Database PDA 320. As will be described in more detail in a later section, the Database Server 350 can use the orphaned redo logs to restore the Pluggable Database PDA 320 to a different incarnation if required.

In an embodiment, the Database Server 350, after rolling back the active transactions on the Pluggable Database PDA 320, drops or otherwise discards the Clone Database 500 and brings the Pluggable Database PDA 320 online or otherwise available for user interaction.

Database Incarnations

In general, a database incarnation is a new "version" of a database that happens when a database is subjected to point-in-time recovery. For example, a database incarnation may fall into various categories, such as current, parent, ancestor, and sibling incarnation. The current incarnation represents the incarnation for which the database server is currently generating redo records. In other words, the current incarnation may be considered the "active" state of the database. A parent incarnation represents the incarnation from which the current incarnation branched following a point-in-time recovery. An ancestor incarnation represents the parent of the parent incarnation, and other further removed ancestors. Sibling incarnations represent two incarnations that share a common ancestor, if neither is an ancestor of the other.

For a singular (non-container) database, incarnations are often assigned a version number which is incremented each time a point-in-time recovery is performed. However, in the context of a container database, one of the pluggable databases may be the recipient of an in-place point-in-time recovery independent of the other pluggable databases. As a result, the concept of "sub-incarnations" is introduced to manage incarnations for container databases.

Figure 6:
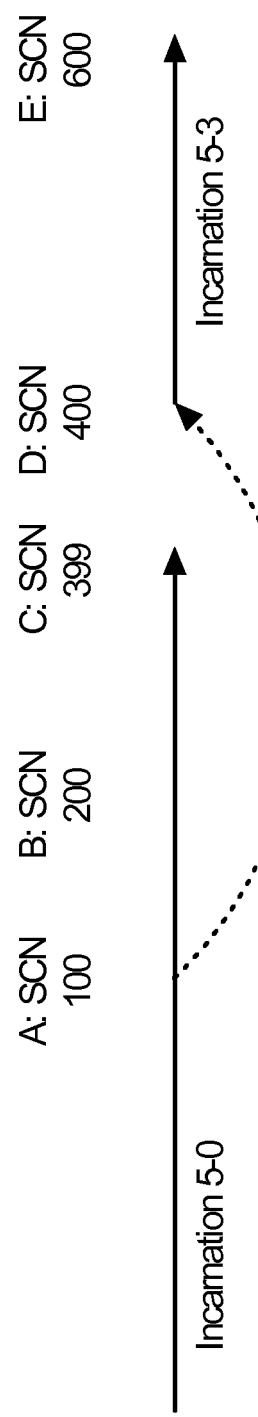
FIG. 6 depicts a database incarnation timeline according to an embodiment.

To illustrate the aforementioned concept, FIG. 6 depicts a database incarnation timeline according to an embodiment. For convenience, it will be assumed Pluggable Database PDA 320 is the subject of the timeline depicted in FIG. 6.

In FIG. 6, the arrows represent a progression in time through the redo records of the Redo Log 340. For example, point A represents the state of the Pluggable Database PDA 320 at SCN 100, point B represents the state of Pluggable Database PDA 320 at SCN 200, and so forth.

Incarnations are identified by two version numbers, the first of which represents the version number of the Container Database 300 and the second represents the version number of the Pluggable Database PDA 320. Thus, the first version number represents the "incarnation" and the second version number represents the "sub-incarnation". In an embodiment, the first version number is incremented each time the Container Database 300 as a whole is the recipient of a recovery and the second version number is incremented each time any pluggable database of the Container Database 300 is the recipient of a recovery. Thus, Incarnation 5-0 indicates that the Container Database 300 has been recovered 5 times and, as of the $5^{th}$ recovery, the pluggable databases have been recovered 0 times. The aforementioned version assignments ensure that each incarnation is assigned a unique identifier. However, since the second version number is incremented when any pluggable database is recovered, the second version number does not necessarily indicate how many times a particular pluggable database has been recovered. In another embodiment, the incarnations may be additionally identified by a pluggable database identification number, allowing the second version number to be incremented independently for each pluggable database while maintaining unique identifiers.

In FIG. 6, Pluggable Database PDA 320 proceeded to point C at SCN 399 along Incarnation 5-0 when the Database Server 350 detected an error. In response, the Database Server 350 performed an in-place point-in-time recovery bringing the Pluggable Database PDA 320 to point A at SCN 100. As a result of the point-in-time recovery, the Pluggable Database PDA 320 branches off into Incarnation 5-3 where the Pluggable Database PDA 320 proceeded through point D at SCN 400 and onwards to point E at SCN 600. The dotted line connecting point A to point D represents that the redo records in between point A and point D have been effectively orphaned. Thus, although the aforementioned records remain in the Redo Log 340, the Database Server 350 will by default skip over those records while performing future recovery. In an embodiment, the sub incarnation metadata specifies one or more ranges of redo records to skip. The sub incarnation metadata may be stored in a control file (not included in FIG. 3B) that stores metadata about the physical structure of the entire Container Database 300. In the example above, the control file may store a skip range for Incarnation 5-3 indicating a starting point of SCN 100 and an ending point of SCN 400.

In the case of FIG. 6, the metadata may specify to skip the redo records in between SCN 100 and SCN 400 during block 401 of FIG. 4 and the redo records corresponding to the same time period during block 403 of FIG. 4.

However, in some cases, the Database Server 350 may be requested by a user to return to an incarnation that had previously been orphaned. For example, the user may realize that the Pluggable Database PDA 320 should have been recovered to point B at SCN 200 along the parent incarnation. In an embodiment, the Database Server 350 supports a command by which a user may specify the SCN and the incarnation to which the Pluggable Database PDA 320 should be recovered. For example, the user may specify to recover to SCN 200 along Incarnation 5-0. In response, the Database Server 350 performs point-in-time recovery restoring to a backup of the Pluggable Database PDA 320 prior to point A and applying redo records, including the previously orphaned redo records, up to SCN 200. As a result, the redo records pertaining to Incarnation 5-3 become newly orphaned redo records and the Database Server 350 marks in the Database Dictionary 321 that redo records corresponding to SCN 400 through SCN 600 should be skipped.

Standby Databases

In some embodiments, the Database Server 350, in addition to managing the Container Database 300, also manages a standby database. The standby database acts as a functioning backup of the Container Database 300 which can be substituted for the Container Database 300 in the event that the Container Database 300 suffers a critical failure. Thus, during operation, the Database Server 350 propagates actions performed on the Container Database 300 to the standby database. In the event that the Container Database 300 undergoes pluggable database point-in-time recovery, a user (e.g. an administrator) can restore the pluggable database on the standby to before the branch point using an existing backup at the standby. After that, standby recovery can recover through the point-in-time recovery operation received on the primary. As a result, no import of the pluggable database on the standby from the primary is required.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
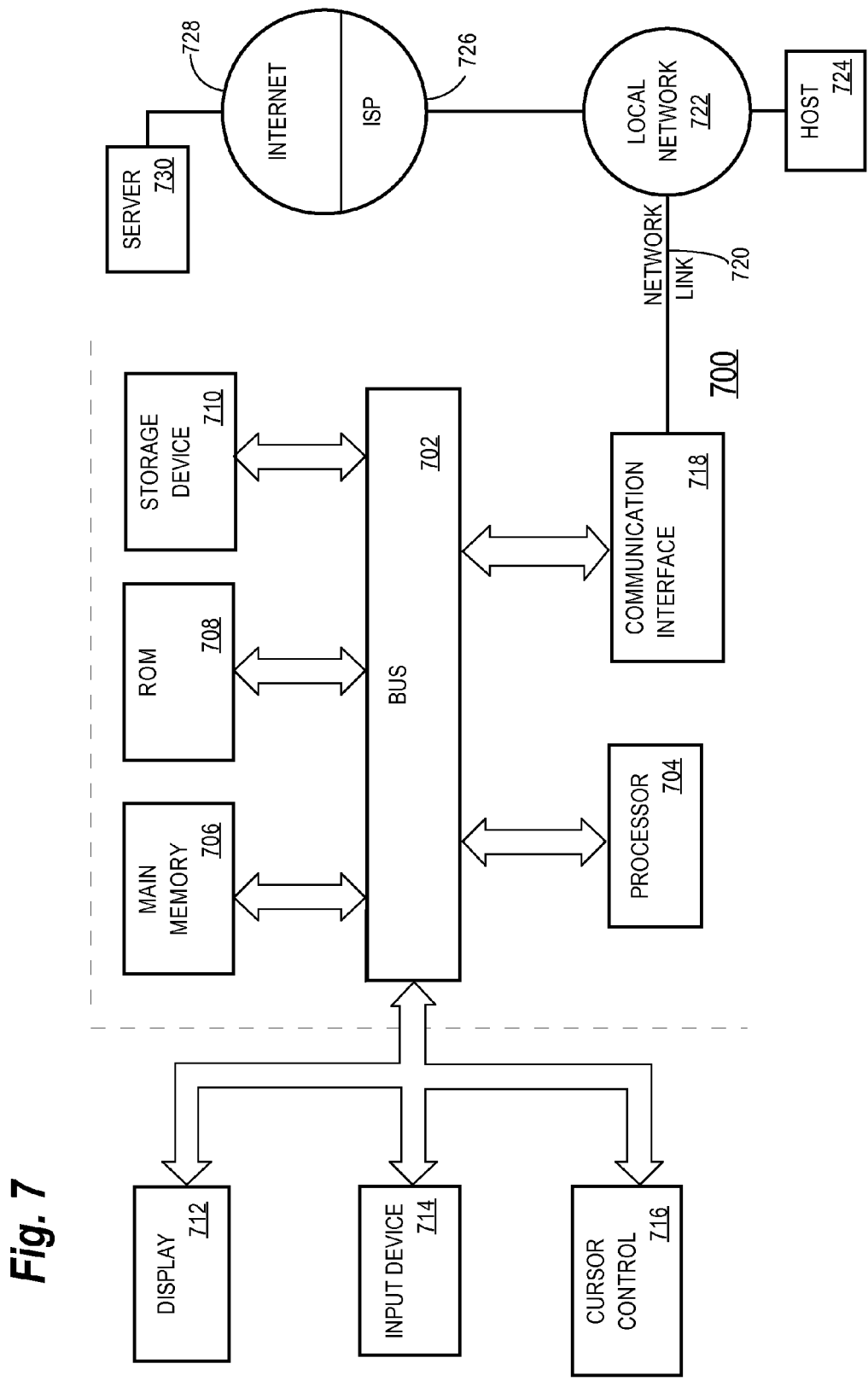
FIG. 7 is a block diagram that illustrates an example computer system upon which an embodiment of the invention may be implemented.

For example, FIG. 7 is a block diagram that illustrates an example computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   a database server maintaining a container database, wherein the container database comprises:
   one or more pluggable databases,
   a root database that stores an undo log for rolling back transactions on the one or more pluggable databases, and
   a redo log for replaying modifications to the container database;
   the database server restoring a particular pluggable database with a backup version of the particular pluggable database that corresponds to a first point in time;
   the database server generating a clone database loaded with a backup version of the root database that corresponds to the first point in time, the clone database including a backup version of the undo log of the root database;
   the database server applying one or more redo records of the redo log to recover the particular pluggable database and the clone database, including the backup version of the undo log, to a second point in time that is later than the first point in time;
   the database server identifying, based on the backup version of the undo log in the clone database, one or more active transactions on the particular pluggable database that have not committed by the second point in time;
   the database server rolling back the one or more active transactions, wherein modifications to the particular pluggable database performed during roll back of the one or more active transactions are recorded in the redo log;
   wherein the method is performed by one or more computing devices.

2. The method of claim 1, further comprising receiving one or more user instructions that specify to recover the particular pluggable database to the second point in time.

3. The method of claim 1, wherein the first point in time corresponds to a state of the container database after a first number of transactions has committed and the second point in time corresponds to a second state of the container database after a second number of transactions has committed, wherein the first number is less than the second number.

4. The method of claim 1, further comprising storing data that is shared between the one or more pluggable databases in the root database.

5. The method of claim 1, wherein the database server does not record modifications to the clone database performed during rollback of the one or more active transactions in the redo log of the container database.

6. The method of claim 1, wherein each pluggable database of the one or more pluggable databases contains a separate data dictionary.

7. The method of claim 1, wherein the root database contains a data dictionary that defines one or more database objects that are shared between the one or more pluggable databases.

8. The method of claim 1, further comprising the database server dropping the clone database.

9. The method of claim 1, wherein at least one pluggable database of the one or more pluggable databases remains available for user transactions while the particular pluggable database is being restored by the database server.

10. The method of claim 1, further comprising:
    the database server restoring the particular pluggable database with a backup version of the particular pluggable database that corresponds to a third point in time that is earlier than the second point in time;
    the database server applying one or more redo records of the redo log to recover the particular pluggable database to a fourth point in time that is later than the second point in time.

11. A non-transitory computer-readable storage medium storing one or more instructions which, when executed by one or more processors, cause the one or more processors to:
    maintain, via a database server, a container database, wherein the container database comprises:
    one or more pluggable databases,
    a root database that stores an undo log for rolling back transactions on the one or more pluggable databases, and
    a redo log for replaying modifications to the container database;
    restore, via the database server, a particular pluggable database with a backup version of the particular pluggable database that corresponds to a first point in time;
    generate, via the database server, a clone database loaded with a backup version of the root database that corresponds to the first point in time, the clone database including a backup version of the undo log of the root database;
    apply, via the database server, one or more redo records of the redo log to recover the particular pluggable database and the clone database, including the backup version of the undo log, to a second point in time that is later than the first point in time;
    identify, via the database server, based on the backup version of the undo log in the clone database, one or more active transactions on the particular pluggable database that have not committed by the second point in time;
    roll back, via the database server, the one or more active transactions, wherein modifications to the particular pluggable database performed during roll back of the one or more active transactions are recorded in the redo log.

12. The non-transitory computer-readable storage medium of claim 11, wherein the one of more instructions further cause the one or more processors to receive one or more user instructions that specify to recover the particular pluggable database to the second point in time.

13. The non-transitory computer-readable storage medium of claim 11, wherein the first point in time corresponds to a state of the container database after a first number of transactions has committed and the second point in time corresponds to a second state of the container database after a second number of transactions has committed, wherein the first number is less than the second number.

14. The non-transitory computer-readable storage medium of claim 11, wherein the one or more instructions further cause the one or more processors to store data that is shared between the one or more pluggable databases in the root database.

15. The non-transitory computer-readable storage medium of claim 11, wherein the database server does not record modifications to the clone database performed during rollback of the one or more active transactions in the redo log of the container database.

16. The non-transitory computer-readable storage medium of claim 11, wherein each pluggable database of the one or more pluggable databases contains a separate data dictionary.

17. The non-transitory computer-readable storage medium of claim 11, wherein the root database contains a data dictionary that defines one or more database objects that are shared between the one or more pluggable databases.

18. The non-transitory computer-readable storage medium of claim 11, wherein the one or more instructions further cause the one or more processors to drop, via the database server, the clone database.

19. The non-transitory computer-readable storage medium of claim 11, wherein at least one pluggable database of the one or more pluggable databases remains available for user transactions while the particular pluggable database is being restored by the database server.

20. The non-transitory computer-readable storage medium of claim 11, wherein the one or more instructions further cause the one or more processors to:
   restore, via the database server, the particular pluggable database with a backup version of the particular pluggable database that corresponds to a third point in time that is earlier than the second point in time;
   apply, via the database server, one or more redo records of the redo log to recover the particular pluggable database to a fourth point in time that is later than the second point in time.

* * * * *